United States Patent [19]

Fritchman

[11] Patent Number: 4,723,896
[45] Date of Patent: Feb. 9, 1988

[54] COMPRESSOR DISCHARGE VALVE ASSEMBLY

[75] Inventor: Jack F. Fritchman, Cullman, Ala.

[73] Assignee: White Consolidated Industries, Inc., Cleveland, Ohio

[21] Appl. No.: 44,585

[22] Filed: Apr. 30, 1987

[51] Int. Cl.⁴ .................. F04B 21/02; F16K 15/16
[52] U.S. Cl. .................... 417/571; 137/856; 137/857
[58] Field of Search .............. 417/559, 570, 569, 571, 417/902, 454; 137/851, 855, 856, 857

[56] References Cited

U.S. PATENT DOCUMENTS

| | | | |
|---|---|---|---|
| Re. 15,472 | 10/1922 | Riesner | 417/571 |
| 3,039,487 | 6/1962 | Doeg | 417/569 |
| 3,400,885 | 9/1968 | Enemark et al. | 417/571 |
| 4,352,377 | 10/1982 | Fritchman | 137/851 |
| 4,524,806 | 6/1985 | Romer | 137/856 |

*Primary Examiner*—Carlton R. Croyle
*Assistant Examiner*—Leonard P. Walnoha
*Attorney, Agent, or Firm*—Pearne, Gordon, McCoy & Granger

[57] ABSTRACT

A hermetic refrigeration compressor has a flat valve plate closing off a cylinder bore. The valve plate has an elongated recess on the outer side around the discharge port and a discharge valve assembly, comprising a flat reed valve and backing spring, fits within the recess beneath an overlying valve stop which engages the bottom of the recess at each end. The recess, the reed valve, the backing spring, and the valve stop are so configured that they can be assembled only in the correct configuration. The valve stop is held in place by an arcuate retaining spring having ends engaging notches in the valve plate and a projecting boss on a cylinder head defining a discharge valve plenum engages the retaining spring to press the spring and the valve plate into position within the recess to retain all of the parts in operating position.

16 Claims, 9 Drawing Figures

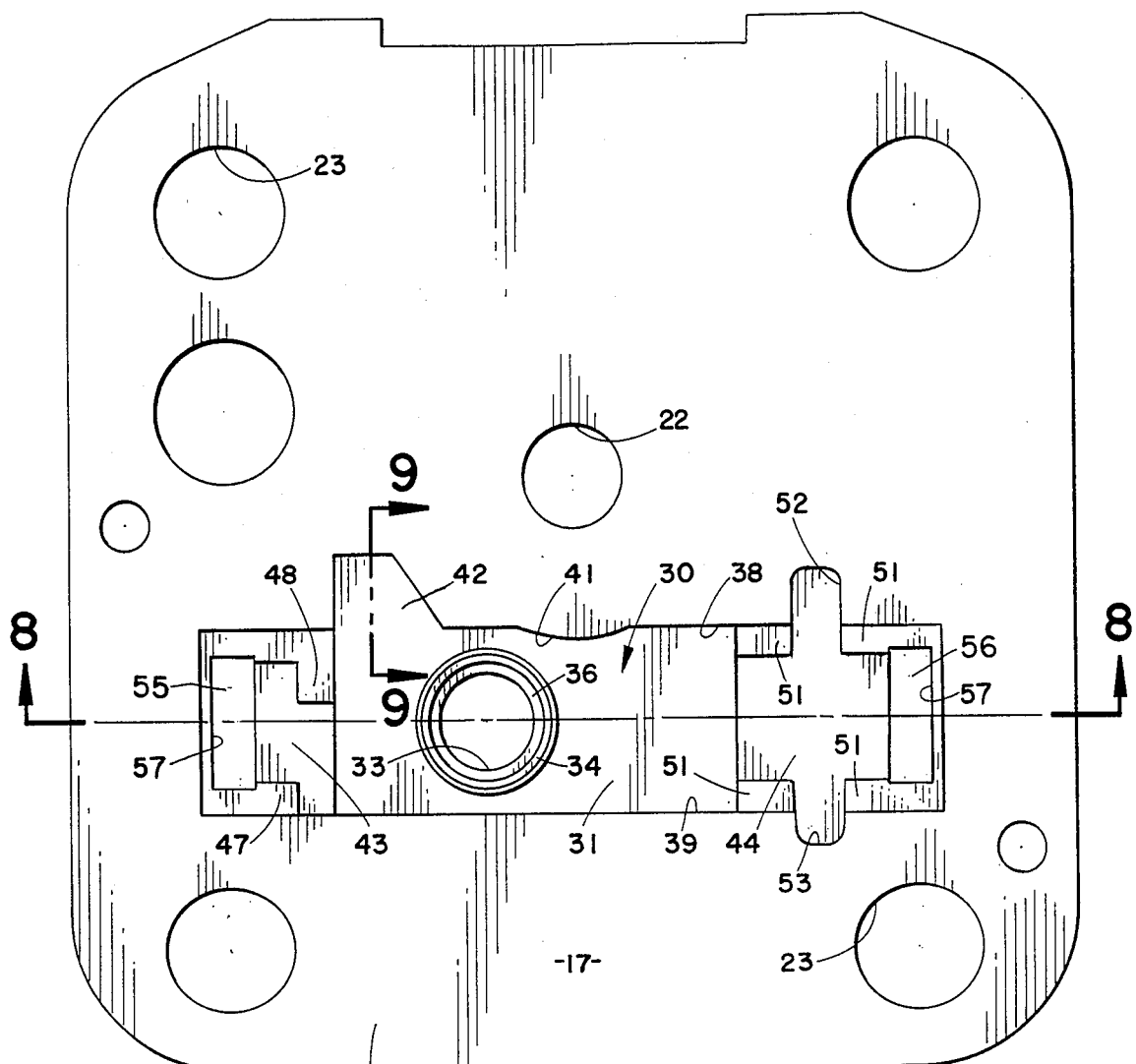
FIG. 7
FIG. 8
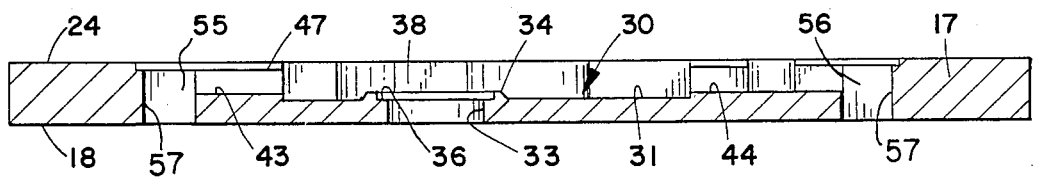
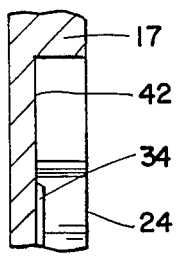
FIG. 9

COMPRESSOR DISCHARGE VALVE ASSEMBLY

BACKGROUND OF THE INVENTION

This invention relates generally to hermetic refrigeration compressors of the reciprocating piston type, and more particularly to such compressors of the small displacement type used in household appliances.

Hermetic refrigeration compressors of the reciprocating piston type find widespread application in such household appliances as refrigerators. freezers, and small room air conditioners. For such reasons as low cost and small size, as well as electrical efficiency, such compressors are usually powered by two pole induction motors which, therefore, have a general operating speed of 3500 rpm, using a 60-hertz power supply. Because of this high speed of operation, it is highly desirable to use a relatively large diameter piston having a relatively short stroke to maintain low average piston velocities to minimize wear and improve mechanical efficiency. However, with a relatively large diameter cylinder bore, together with a short stroke, it tends to become difficult to minimize the clearance volume, which is defined as the space occupied by the compressed refrigerant within the cylinder bore and valve system when the piston is at the end of the compression stroke. The greater the clearance volume, the lower the compressor efficiency, and therefore many efforts are made to reduce the clearance volume to a minimum practical with the other requirements such as the compressor valving.

The valving of compressors of this type usually comprises a single reed valve for each of the suction or intake and discharge or exhaust functions of the compressor. These valves are normally in the form of a reed valve spring-biased to a closed position against a valve seat and openable during the appropriate portion of the compressor cycle by either the incoming or suction gases and during the compression portion of the piston cycle by the discharge gases. In a typical arrangement, the open end of the cylinder is closed off by a flat, parallel sided valve plate through which extend generally cylindrical suction and discharge ports. The suction valve, which operates under the relatively low pressure of the suction gases, is formed as a cutout portion of a sheet of spring material, and fits against the underside of the valve plate adjacent the piston. Since the suction port is sealed off on the piston side, the ported side does not contribute to any of the clear ance volume, which, in the case of the suction valve, is limited to the cutout portion of the valve sheet defining the reed valvo.

On the other hand, the discharge valve is mounted on the outer side of the valve plate and, because of the high pressure of the discharge gases, generally requires a more rugged structure to provide efficient operation and long life. Because this valve seals on the outer side of the valve plate, the entire area of the discharge valve port becomes part of the clearance volume and generally forms a substantial portion thereof.

Heretofore, discharge valves generally required a rigid stop member, as well as back-up valve springs, to limit the movement of the reed valve, and these members had to be mounted on the valve plate itself to provide a simple and low-cost structure. One such arrangement is shown in U.S. Pat. No. 4,352,377, which utilizes a reed valve, a back-up spring, and a heavy, rigid stop member, all of which are mounted over a pair of mounting posts secured to the valve plate itself. A retaining spring, also secured to these valve posts, operates to secure the other members in place, and to provide an easy arrangement for assembling the various parts of the discharge valve in place during the assembly of the compressor.

It has been recognized that on approach to improving the volumetric efficiency of the compressor by decreasing the clearance volume is to decrease the volume of the discharge port. To decrease this volume by decreasing the diameter of the opening has limited effectiveness because a decreased size opening results in greater restriction to flow of the discharged gases through this port, and is therefore self-defeating. The other alternative is to reduce the axial length of the discharge port, but reducing the overall thickness of the valve plate at all points has limitations because of the requirement for a minimum thickness for secure mounting of the posts as well as to resist the flexing of the valve plate under the alternating stresses applied during the suction and compressive strokes of the piston.

One approach to this problem has been by the use of a relatively thick valve plate having an elongated recess on the outer side into which the discharge port opens to thereby reduce its axial length. Since the valve plate at this point is too thin the mount support posts directly on the valve plate, this arrangement, as shown in U.S. Pat. No. 4,524,806, granted June 25, 1985, utilizes a frame member which fits within the recess and carries a pair of support posts at the opposite end. Thus, a reed valve, back-up spring, retainer plate, and retainer spring can then be mounted on the posts on this insert, which is made a frictional fit within the recess. While such an arrangement allows preassembly of all of the valve parts, it relies entirely upon the frictional fit of the insert within the recess to hold the valve assembly in place, so that any movement of the insert in the recess will tend to move the unit away from the valve seat, and thereby adversly affect the operation of the valve.

SUMMARY OF THE INVENTION

The present invention provides an improved discharge valve assembly in which the reed valve is mounted within a specially shaped recess formed in the valve plate. The discharge port opens into this space, and thereby has an axial length substantially less than the thickness of the remainder of the valve plate. The reed valve has a head end adapted to make sealing contact with a valve seat around the discharge port within the recess, and at its opposite end has a pair of extending legs of unequal length which fit within corresponding portions of the shaped recess to ensure that the reed valve can be assembled in only one position. A shaped backing spring has similar legs, and overlies the reed valve to provide a controlled opening and closing action for the reed valve. A rigid stop member is formed with laterally projecting portions at each end, as well as vertically extending lugs, also to fit within the recess, the shape of these three members and the recess being such that all of the members can be assembled in only a single position. A valve retainer spring overlies the stop member and has an arched configuration in which the ends engage the upper side of the stop member, and the projecting ends extend through openings formed in the valve plate outwardly of the cylinder bore. The lower edges of these openings engage the sloping ends of the spring to thereby hold the valve assembly as a unit on the valve plate before assembly of the compressor is completed. When the cylinder head is attached in place to form the discharge plenum surrounding the discharge valve, a portion of the cylinder head engages the center of the retainer spring to further bias it in a direction toward the valve plate and more positively secure the stop plate in position in the recess during operation of the compressor.

BRIEF DESCRIPTION OF THE DRAWINGS

FIG. 7 is a plan view of the valve plate with all of the valve members removed, showing the configuration of the recess;

FIG. 8 is a cross-sectional view of the valve plate, taken on line 8—8 of FIG. 7; and FIG. 9 is a cross-sectional view taken on line 9—9 of FIG. 7.

DESCRIPTION OF THE PREFERRED EMBODIMENT

Figure 1:
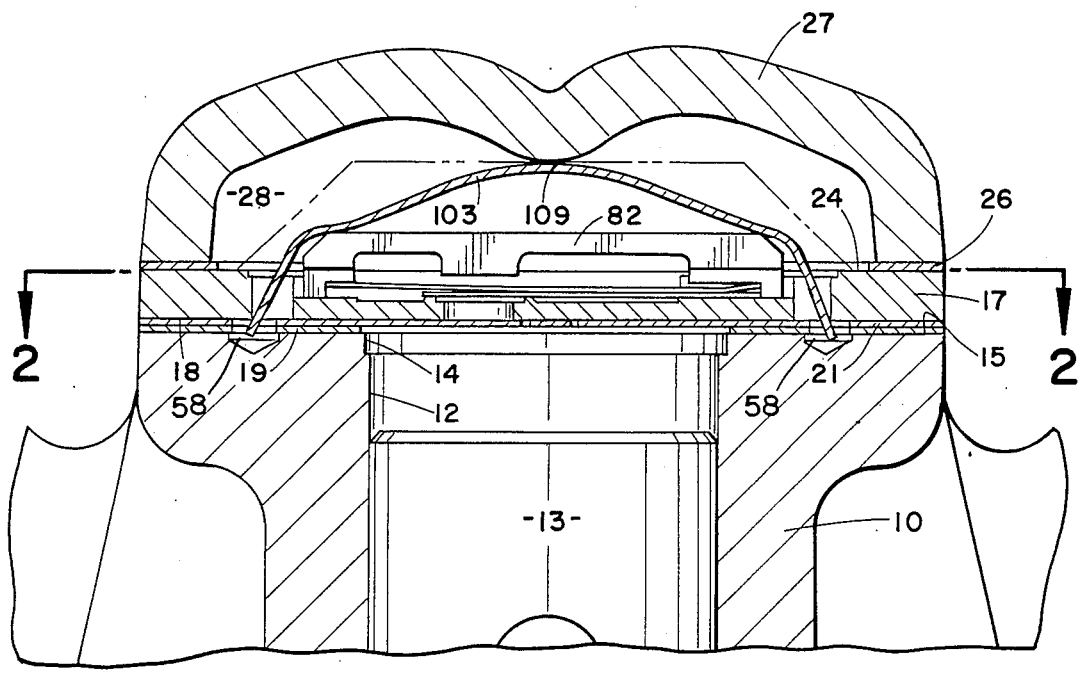
FIG. 1 is a fragmentary, cross-sectional view through the cylinder block and cylinder head portion of a reciprocating piston compressor, showing the discharge valve of the present invention.

Referring to the drawings in greater detail, FIG. 1 shows a fragmentary, cross-sectional view of a refrigeration compressor, cylinder block and head incorporating a discharge valve of the present invention. As shown in FIG. 1, only a fragmentary portion at the head end of a cylinder block 10 is shown, and the remaining portion of the cylinder block and the rest of the construction of the compressor may be of any conventional construction as is well known in the art. The cylinder block 10 has a cylinder bore 12 in which is mounted a piston 13 which is reciprocated by the electric drive motor through a crankshaft and connecting rod arrangement, as is well known in the art.

The cylinder block 10 has an end face 15 extending perpendicular to the cylinder bore 12, which has a slight counterbore 14 adjacent the end face. The cylinder bore 12 is closed off by means of a valve plate 17 mounted adjacent the end face 15 of the cylinder block 10. The valve plate 17 has an inner side face 18 adjacent the end face 15 from which it is spaced by a gasket 19 in contact with the end face 15 and a valve sheet 21 in abutting contact with the inner side 18. The valve sheet 21 has a cutout portion (not shown) defining a suction valve adapted to seal off the suction port 22 extending from side to side to the valve plate 17. The valve plate 17 also has bolt holes 23 through which bolts extend to hold the assembly to the cylinder block 10. It will be understood that the gasket 19 is a selective fit and has a cutout portion around the cylinder bore 12. This allows the clearance volume which remains when the piston 13 is at top dead-center to be held at a minimum, since the piston 13 is arranged to extend as close as possible to the cylinder block end face 15, and even project slightly thereabove. Thus, gasket 19 is fitted with a thickness depending upon the relationship between the end of the piston 13 and the cylinder block end face 15 to allow the minimum clearance possible without risk of having the piston contact the valve sheet because of the forces present when the compressor is running at its full speed of 3500 rmp.

On its outer side, the valve plate 17 has a face 24 parallel with the inner face 18, and against which are mounted a gasket 26 and the cylinder head 27, which is preferably held in place with the same bolts that pass through the bolt holes 23 to clamp the cylinder head and valve plate to the cylinder block as a unit. The cylinder head 27 and gasket 26 also separate plenum (not shown) around the suction port 22 and a discharge plenum 28 in which the discharge valve is mounted.

The discharge valve is mounted in a recess 30 formed on the outer face 24 of valve plate 17. The recess 30 allows he thickness or axial length of the discharge port to be reduced, to thereby also reduce the clearance volume. The recess 30 is shaped to minimize any weakness of the valve plate and to allow minimum restriction to fluid flow, and also to ensure that the various discharge valve components can be assembled only in the right position within the recess, thereby making the assembly operation fool-proof. The entire valve plate 17 is preferably made by a powdered metal process which allows the irregular contours of the recess 30 to be formed during the original pressing operation, and therefore does not increase the machining operations required for the finished valve plate.

Figure 2:
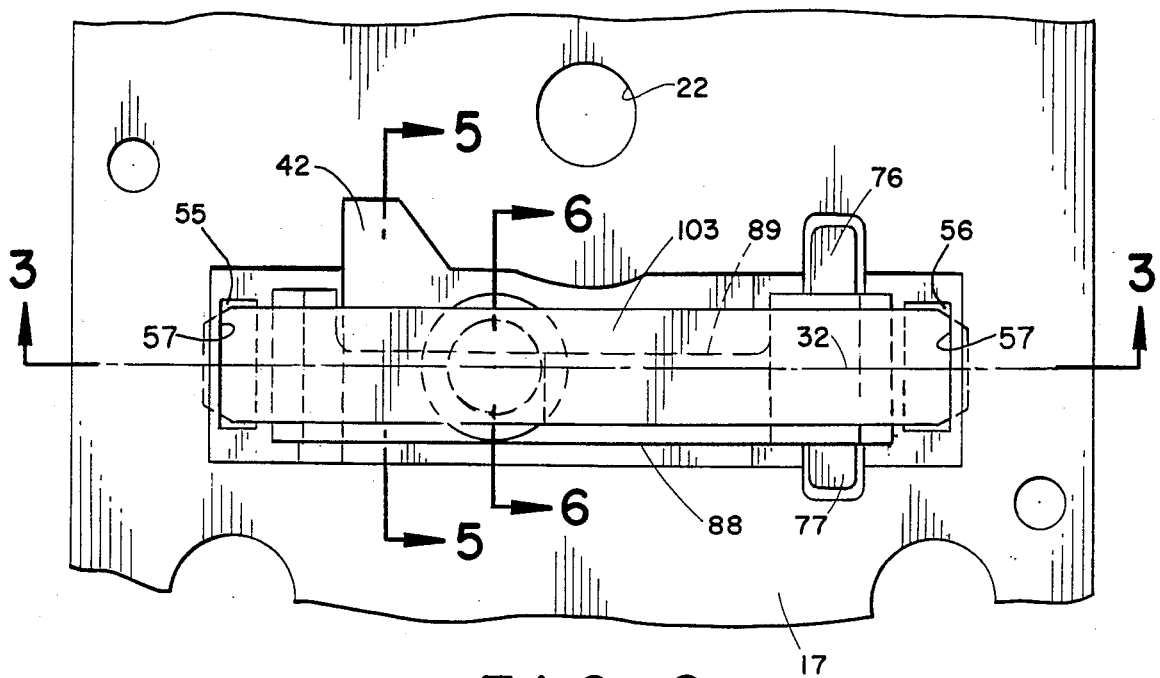
FIG. 2 is an enlarged plan view of the discharge valve of FIG. 1, taken on line 2—2 of FIG.

The recess 30 is formed with a central portion 31 extending along a central axis 32 (see FIGS. 2, 7 and 8), at which point the valve plate has a minimal thickness which may be slightly less than half the thickness of the major portion of the valve plate between the sides or faces 18 and 24. The discharge port 33 is located in the central portion 31 on axis 32, and extends from the inner valve plate side 18 to a raised annular valve seat 34 having a flat upper surface with an annular area which is sufficiently large to ensure proper sealing of the reed valve while also being sufficiently small to ensure a high sealing contact pressure. Accordingly, there is a small counterbore 36 within the valve seat 34 having a slightly larger diameter than that of the discharge port 33, which is cylindrical in shape. The recess 30 is generally rectangular in shape to have parallel inner and outer, vertical sides 38 and 39 extending up to the face 24. The inner side 38 has an arcuate projection 41 in the line with the suction port 22 to ensure accommodation of the gasket 26 in that area. In addition, there is a relief cut, as shown at 42, tapering from the central portion 31 outwardly to the face 24 to minimize flow restriction, as explained in greater detail hereinafter.

At each end of the central portion 31 are slightly raised recesses 43 and 44 which are parallel to the face 24 and generally coplanar with the surface of the valve seat 34. These recesses 43 and 44 are narrower than the space between the sides 38 and 39, and are formed with irregular side walls to ensure proper assembly of the valve parts. For example, the left recess 43 is restricted by a step portion 47 and a projection 48, while the right recess 44 is provided with four step portions 51 defining a narrower space than that between the walls 38 and 39, as well as notches 52 and 53 of different length extending transversely to the central axis 32. The notches 52 and 53, with the notch 52 being longer than the other, extend outwardly into the valve plate and are the full depth between the bottom of the recess 44 and the surface 24. By making the notch 52 longer than notch 53, correct assembly of the reed valve and back-up spring is assured, as described hereinafter. Outwardly of the recesses 43 and 44 are a pair of openings 55 and 56 extending all the way through the valve plate to the inner side 18. These openings 55 and 56 have outer sides 57 in alignment with clearance recesses 58 in the cylinder block for receiving the ends of a retaining spring. Since the spacing between the openings 55 and 56 is substantially greater than the diameter of the cylinder bore, the fact that these openings extend all the way through the valve plate 17 does not affect the operation of the compressor.

The reed valve 61 is mounted within the recess 30 and has a base portion 62 fitted within the recess 44. A neck 63 of reduced width extends from the base 62 to terminate in an enlarged, generally circular valve head 64 having a diameter slightly greater than that of valve seat 34 and operable to make sealing contact with the valve seat. The reed valve 61 may be entirely flat so that, in the unstressed condition, it makes full sealing contact with the valve seat 34 or, alternatively, the reed valve may be constructed, in accordance with this inventor's U.S. Pat. No. 4,642,037, granted Feb. 10, 1987. If the reed valve is to incorporate the invention of this patent, then the reed valve 61 must be deformed along a diagonal bend line across the neck 63 so that the valve head 64 is, when in the unstressed condition, slightly inclinded to the plane of the valve seat 34 so make contact only along one side thereof. In the present design, that would preferably be the side adjacent the recess side 39 for improved gas flow characteristics.

Alternatively, the teachings of that patent can also be accomplished by inclining the valve seat 34 at a 2-degree angle with respect to the plane of the valve plate faces 24 so that a flat reed valve would make contact only at the one portion on the valve seat when in the unstressed condition.

A backing spring 38 is mounted in the recess 30 above the reed valve 61, and has a base 69 overlying the reed valve base 62 and a shank 71 extends from the base 69 to terminate in a tip portion 72 within the other recess 43. The shank 71 has a straight side 73 adjacent the recess wall 39, and the other side has a tapered portion 74 extending part way to the tip 72, so that the narrower tip portion 72 extends in width from the straight side 73 only to approximately the centerline 32 of the recess 30 and, hence, the center of the discharge port 33. Because of the tapered shape of the backing spring 68, it does not cover the area around the valve head 64 which is adjacent the relief cut 42 to avoid restricting the discharge flow through the discharge port when the valve is open. The base 69 of backing spring 68 has projecting ears 76 and 77 which overlie similar ears (not shown) on the reed valve base 62, which are of substantially similar dimensions. The one ear 76 is substantially longer than the other ear 77, and is arranged to fit within the notch 52, while the shorter ear 77 is adapted to fit in the shorter notch 53. Because these ears 76 and 77 are of unequal length, neither the reed valve 61 nor the backing spring 68 will fit within the recess 30 if they are turned upside down so that the ears 76 and 77 are reversed. Thus, both the reed valve 61 and backing spring 68 can be mounted within the recess 30 only in the correct position.

It should be further noted that the backing spring 68 is made of a spring steel of substantially the same thickness as that used for reed valve 61, and is not flat but is bent along a bend line 79 formed in the shank 71 immediately adjacent the base portion 69. The bend line 79 results in a plastic deformation of the backing spring 68 so that it normally makes contact with the reed valve only at the bend line 79, and both the base 69 and the tip 72 are then bent upwardly away from the reed valve 61, as will be described in greater detail hereinafter.

The reed valve 61 and backing spring 68 are held in place nd their movement controlled by a valve stop 82. Valve stop 82 is a rigid member of rather complex shape which, however, may be easily formed through powdered metal technology. The valve stop includes an enlongated body portion 83 having a top surface 84 which extends generally parallel to and spaced above the outer valve plate face 24. The valve stop has one end portion 86 adaptd to fit within the recess 43 on the valve plate, and at the other end an end portion 87 adapted to fit within the other recess 44. Each of the ends 86 and 87 is shaped in a different manner to fit the adjacent recess, so that the valve stop cannot be turned end-for-end. Teh body portion 83 has a straight vertical side 88 extending from end to end adjacent the outer side 39 of recess 30. The other vertical side 89 of the valve stop is recessed between the ends 86 and 87 to extend generally close to the longitudinal axis 32 passing through the center of the discharge port 33. Thus, the body portion 83 generally overlies the tip portionb 72 of backing spring 6b, and because the side 89 is recessed, this aids in the flow of the refrigerant gas into the discharge plenum 28 when the valve is opened.

At the one valve stop end 86, the outer surface is formed with chamfer 91 and terminates in a vertically extending end lug 92 having a horizontal extent substantially equal to that of the recess 43 between the step portion 47 and the opposite side. Inwardly of the end lug 92 is a raised stop surface 93 having a width between the projection 48 and the opposite side so that it is less than the full width of the end lug 92. The stop 93 is arranged to engage the tip portion 72 of the backing spring 68 to limit its upward travel.

The other end 87 of the valve stop likewise has a chamfer 96 similar to chamfer 91 and an end lug 97 similar to end lug 92. The end lug 97 is adapted to engage the bottom of recess 44 in the area, between the opening 56 and the notches 52 and 53. Inwardly of the end lug 97 is a stop surface 98 havisng a spacing away from the bottom of the recess 44 equal to the spacing of the stop surface 93 away from the bottom of the recess 43. This stop surface 98 engages the backing spring base 69 as it is bent upwardly along the bend line 79 to overlie both the backing spring base 69 and the reed valve base 62 to hold them in their seated positions.

Figure 3:
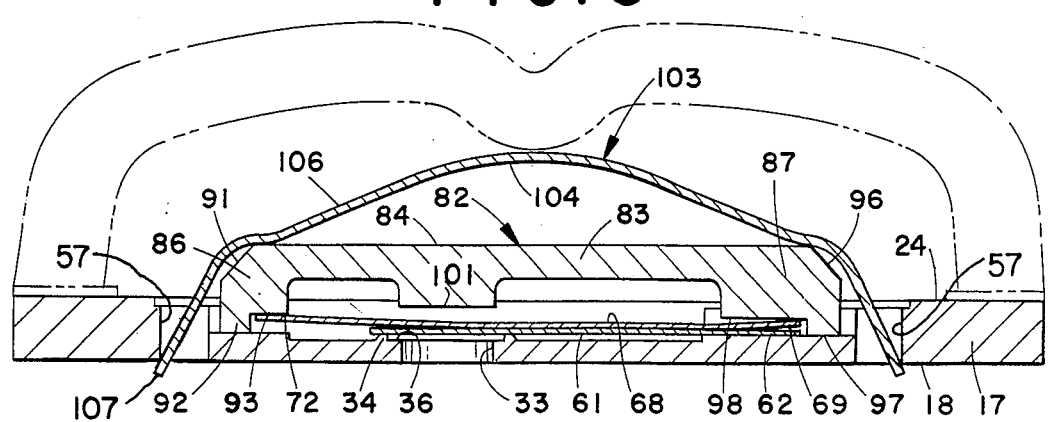
FIG. 3 is an enlarged, cross-sectional view, taken on line 3—3 of FIG. 2.
Figures 5, 6:
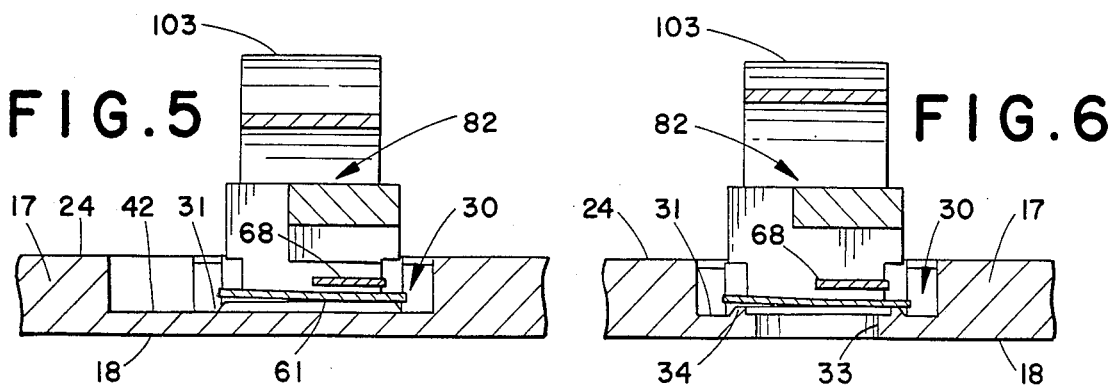
FIG. 5 is an enlarged, cross-sectional view, taken on line 5—5 of FIG. 2.
FIG. 6 is an enlarged, cross-sectional view, taken on line 6—6 of FIG. 2.

In order to limit the opening movement of the reed valve 61, the valve stop body portion 83 has a projecting stop lug 101 on its underside directly over and in with the discharge port 33. As shown most clearly in FIG. 3, with the reed valve 61, backing spring 68, and valve stop 82 in place, the valve stop 82 is positioned by the end lugs 92 and 97 by their engagement with the bottom surfaces of the recesses 43 and 44. When the valve is inthe closed position, the valve head 64 is resting in engagement with the valve seat 34, and is therefore in a flat or unflexed configuration. However, the overlying backing spring 68, because of the deformation along the bend line 79, is therefore positioned so that it makes contact with the reed valve only at the portion of the neck 63 adjacent base 62 to resiliently hold or bias the reed valve base 62 against the bottom of recess 44.

The edge of base 69 is therefore in engagement with the stop surface 98, while the tip portion 72 engages the stop surface 93 at the other end of the valve stop. With the shank 71 of th e backing spring being substantially straingt, it will be seen that the portion of the shank overlying the valve seat 34 is therefore spaced between and out of contact with both the valve head 64 and the stop lug 101.

When the reed valve begins to open during the compression stroke of the piston 13, the valve head 64 will move upward out of engagement with the valve seat 64, and after a predetermined amount of movement, which is resisted only by the flexign of the neck 63, the valve head 64 will engage the backing spring shank 71, which increases the spring rate as further movement of the valve head 64 requires flexing of both the reed valve neck 63 and the backing spring shank 71. Depending upon the conditions within the cylinder bore 12 and the total mass of refrigerant gas within the cylinder, under normal operating conditions the greatest movement of th reed valve head 64 will be in a position where the backing spring shank 71 does not normally engage the stop lug 101. However, if the refrigerant gases have sufficiently high rate of flow, such as under start-up conditions when there is no back spring shank 71 will engage the stop lug 101 to limit further deflection of the reed valve at the neck 63 to avoid any possible overstressing of the parts. When the flow through the discharge port 33 drop to a level where the value can begin to close, the action of the backing spring 68 and the deflection of shank 71 are such as to provide an intial assist in the movement of the value head 64 to the closed position. Since the shank 71 is out of contact with the head 64 when it is seated against value seat 34, the assisting bias of the backing spring 68 terminates during the closing movement of the value head 64 to limit the stress when the value head 64 comes into sealing contact with the value seat 34.

Since the reed value 61, backing spring 68, and value stop 82 merely fit within the recess 30, It is necessary to provide a force for holding them in place by holding the value stop 82 in position with the end lugs 92 and 97 in engagement with the bottom of the recesses 43 and 44. To accomplish this a bowed retainer sprign 103 fits over the value stop 82 and has a radiused center section 104. Extending outward from the center section 104, retainer spring 103 has curved, intermediate portions 106 adapted to make contact with the value stop top surface 84 adjacent the ends 86 and 87. The retainer spring 103 has ends 107 which fit in the openings 55 and 56 and engage the lower edges of sides 57. In order to accommodate the spring ends 107 which extends beyond the inner face 18 of value plate 17, clearance holes are provided in value sheet 21 and gasket 19 in allignment with the clearance recesses 58 formed in end face 15 of the cylinder block 10. This engagement of the retaining spring 103 with the value plate 17 is sufficient to allow a preassembly of the reed value. backing spring, and value stop prior to the assembly of the rest of the compressor. However, it is necessary to provide a more positive bias holding the value stop 82 in place when the cylinder head 87 is assembled on top of the value plate 17 and the head bolts tightened. It will be noted that the cylinder head 27 has a boss 109 in discharge plenum 28 which engages the retainer spring center section 104 to cause the sprign to deflect and increase the biasing force between the intermediat portions 106 and the value stop top surface 84 with sufficient force that at no time during the operation of the compressor does the valve stop 82 move out of its position in engagement with the recess 30.

Figure 4:
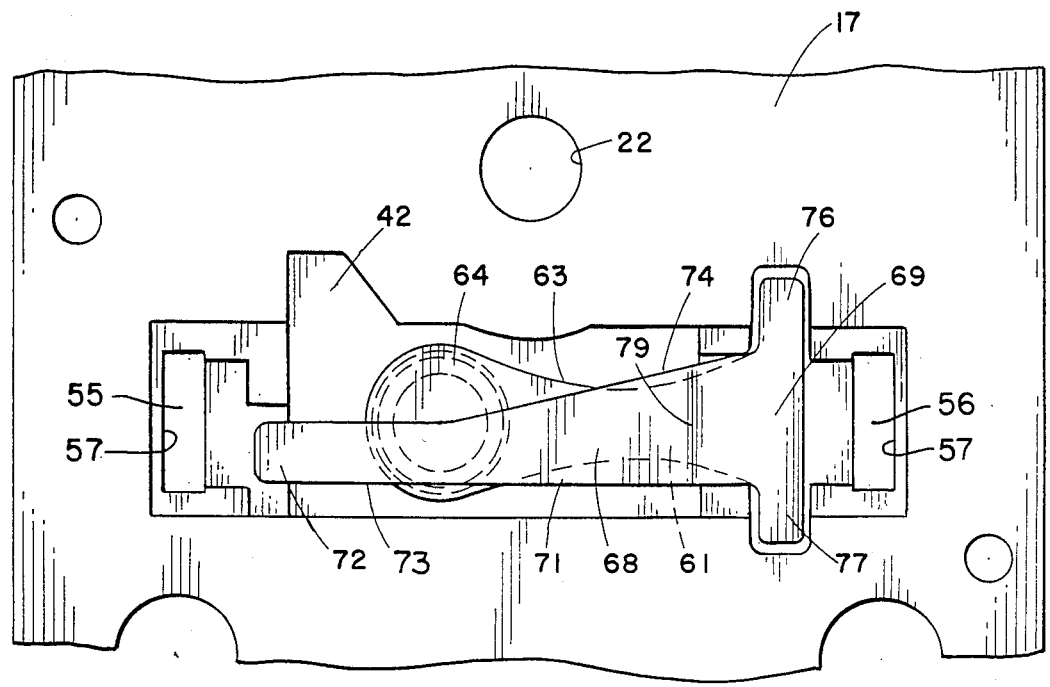
FIG. 4 is a view similar to FIG. 2, but with the retainer spring and stop member removed, showing the relative positions of the reed valve and back-up spring.

Despite the presence of the various value parts within the recess 30. together with the fact that the valve seat 34 is recessed below the outer face 24 of valve plate 17 to reduce the axial length of the port 33, and thereby decrease the clearance volume of the compressor, the arrangement of the recess 30 and the valve parts provides a minimum of restriction for flow of the discharge gases. While the reed valve head 64 overlies the valve seat 34 with a diameter only slightly greater than that of the outer edge of the valve seat, the fact that the backing spring 6B, as it passes over the value head 64, has a width, as shown in FIG. 4, of only about half the width of the valve seat 34, ensures that the backing sprign 6B will provide a minimum of restriction. Likewise. the recessed side 89 of valve stop 82 also overlies only that portion of the valve head 64 and backing spring 68 on the one side of the valve seat. In addition, the relief cut 42 further aids the flow of the discharge gases into the discharge plenum 28, and as a result the restriction of the related valve parts to the flow of the discharge gases is little different than if the valve seat 34 were coplanar with the valve plate outer face 24, as occurs in the prior art.

Although the preferred embodiment of this invention has been described in detail, it sho9uld be understood that various moidifications and rearrangements of the parts may be restorted to without departing from the scope of the invention as disclosed and claimed herein.

What is claimed is:

1. A hermetic refrigeration compressor comprising, a cylinder block said cylinder block having a cylinder with an open end, a piston in said cylinder, a valve plate secured to said cylinder block at said open end, said valve plate having an elongated recess on the side opposite said piston, a discharge port on said valve plate opening into said recess, a reed valve in said recess having a valve head operable to seal said discharge port and lying in adjacent contact with said recess, a rigid valve stop fitted in said recess, said valve stop having a projection at each end engagable with said recess and a portion intermediate said ends spaced away from said reed valve. and an arcuate retainer spring overlying said valve stop and having at least one portion engaging said valve stop, said retainer spring having opposite ends engaging said valve plate.

2. A hermetic refrigeration compressor as set forth in claim 1, including a cylinder head overlying said valve plate and defining a discharge plenum around said recess.

3. A hermetic refrigeration compressor as set forth in claim 2, including a boss on said cylinder head in said discharge plenum in engagement with said retainer spring to bias said retainer spring and said valve stop against said valve plate.

4. A hermetic refrigeration compressor as set forth in claim 1, wherein said valve stop has a projection facing said discharge port arranged to limit movement of said valve head away from said port.

5. A hermetic refrigeration compressor as set forth in claim 1, wherein said recess has a pair of transversely aligned notches of unequal length adjacent one end and said reed valve has a base portion adjacent said notches, said base portion having projecting ears of unequal extending into said notches.

6. A hermetic refrigeration compressor as set forth in claim 5, including a substantially flat backing spring extending between said reed valve and said valve stop.

7. A hermetic refrigeration compressor as set forth in claim 6, wherein said backing spring has a base overlying and substantially coextensive with said reed valve base.

8. A hermetic refrigeration compressor as set forth in claim 7, wherein said backing spring is plastically deformed about a bend line adjacent the base, with said backing spring normally contracting said reed valve at said bend line and normally contacting said valve stop at each end away from said bend line.

9. A hermetic refrigeration compressor as set forth in claim 8, wherein said backing spring and said valve stop are formed over said valve head to extend transversely only from one side of said recess to a point adjacent the center of said discharge port.

10. A hermetic refrigeration compressor discharge valve assembly comprising a valve plate having a surface, said valve plate having an elongated recess in said surface, a discharge port on said valve plate opening into said recess, a reed valve in said recess having a valve head operable to seal said discharge port and lying in adjacent contact with said recess, said reed valve having a base remote from said valve head, a rigid valve stop fitted in said recess, said valve stop having a projection at each end engageable with said recess and a portion intermediate said ends spaced away from said reed valve, and a retainer spring engaging said valve stop to hold said valve stop and said reed valve in said recess.

11. A hermetic refrigeration compressor discharge valve assembly as set forth in claim 10, wherein said recess has two parallel side walls and a bottom surface parallel to said valve plate surface.

12. A hermetic refrigeration compressor discharge valve assembly as set forth in claim 11, wherein said botton surface has end portions engageable by said valve stop projections.

13. A hermetic refrigeration compressor discharge valve assembly as set forth in claim 12, including an annular valve seat around said discharge port coplanar with said end portions.

14. A hermetic refrigeration compressor discharge valve assembly as set forth in claim 13, wherein said recess has a pair of transversely aligned notches of unequal length adjacent the end portion farthest away from said valve seat and sadi read valve has a base portion adjacent said notches, said base portion having projecting ears of unequal length extending into said notches.

15. A hermetic refrigeration compressor discharge valve assembly as set forth in claim 14, including a substantially flat backing spring extend between said reed valve and said valve stop, said backing spring having a base portion overlying and substantially coextensive with said reed valve base.

16. A hermetic refrigeration compressor discharge valve assembly as set forth in claim 15, wherein said valve stop has one edge between said projections parallel to the other edge but positioned to extend along a line overlying the center of said discharge port, said backing spring at the end away from said base having a width coextensive with the width of said valve stop center section.

* * * * *

UNITED STATES PATENT AND TRADEMARK OFFICE
CERTIFICATE OF CORRECTION

PATENT NO. :  4,723,896

DATED      :  February 9, 1988

INVENTOR(S) :  Jack F. Fritchman

It is certified that error appears in the above-identified patent and that said Letters Patent is hereby corrected as shown below:

Column 1, line 11, "refrigerators."
    should be --refrigerators,--

Column 1, line 14, "two pole"
    should be --two-pole--

Column 1, line 49, "clear ance"
    should be --clearance--

Column 1, line 51, "valvo"
    should be --valve--

Column 2, line 6, "on"
    should be --one--

Column 2, line 25, "the"
    should be --to--

Column 3, line 15, after "line 2-2 of FIG."
    insert --1;--

Column 4, line 6, "rmp"
    should be --rpm--

Column 4, line 13, after "separate"
    insert --the space on the valve plate face 24 into a suction--

Column 4, line 18, "allows he"
    should be --allows the--

Column 4, line 48, after "projection 41 in"
    delete --the--

UNITED STATES PATENT AND TRADEMARK OFFICE
CERTIFICATE OF CORRECTION

PATENT NO. : 4,723,896

DATED : February 9, 1988

INVENTOR(S) : Jack F. Fritchman

It is certified that error appears in the above-identified patent and that said Letters Patent is hereby corrected as shown below:

Column 5, line 23, after "constructed"
    delete the comma

Column 5, line 29, "inclinded"
    should be --inclined--

Column 5, line 29, after "valve seat 34 so"
    insert --as to--

Column 5, line 36, "faces"
    should be --face--

Column 5, line 37, "portion"
    should be --point--

Column 5, line 39, "backing spring 38"
    should be --backing spring 68--

Column 6, line 9, "nd"
    should be --and--

Column 6, line 21, "Teh"
    should be --The--

Column 6, line 27, "portionb"
    should be --portion--

Column 6, line 28, "backing spring 6b"
    should be --backing spring 68--

Column 6, line 44, after "area"
    delete the comma

UNITED STATES PATENT AND TRADEMARK OFFICE
CERTIFICATE OF CORRECTION

PATENT NO. : 4,723,896  Page 3 of 7

DATED : February 9, 1988

INVENTOR(S) : Jack F. Fritchman

It is certified that error appears in the above-identified patent and that said Letters Patent is hereby corrected as shown below:

Column 6, line 55, after "over and in"
    insert --line--

Column 6, line 61, "inthe"
    should be --in the--

Column 7, line 4, "th e"
    should be --the--

Column 7, line 5, "straingt"
    should be --straight--

Column 7, line 13, "flexign"
    should be --flexing--

Column 7, line 21, "th reed valve"
    should be --the reed valve--

Column 7, line 25, after "is no back"
    insert --pressure within the discharge plenum 28, the backing--

Column 7, line 29, "drop"
    should be --drops--

Column 7, line 32, "value"
    should be --valve--

Column 7, line 34, "value"
    should be --valve--

Column 7, line 36, "value"
    should be --valve--

UNITED STATES PATENT AND TRADEMARK OFFICE
CERTIFICATE OF CORRECTION

PATENT NO. : 4,723,896

DATED : February 9, 1988

INVENTOR(S) : Jack F. Fritchman

It is certified that error appears in the above-identified patent and that said Letters Patent is hereby corrected as shown below:

Column 7, line 37, "value"
    should be --valve--

Column 7, line 38, "value"
    should be --valve--

Column 7, line 39, "reed value 61,"
    should be --reed valve 61,--

Column 7, line 39, "and value"
    should be --and valve--

Column 7, line 40, "recess 30, It is"
    should be --recess 30, it is--

Column 7, line 42, "value"
    should be --valve--

Column 7, line 44, after "To accomplish this"
    insert a comma

Column 7, line 44, "sprign"
    should be -spring--

Column 7, line 45, "value"
    should be --valve--

Column 7, line 48, "value"
    should be --valve--

Column 7, line 53, "value"
    should be --valve--

UNITED STATES PATENT AND TRADEMARK OFFICE
CERTIFICATE OF CORRECTION

PATENT NO. :  4,723,896

DATED :  February 9, 1988

INVENTOR(S) :  Jack F. Fritchman

It is certified that error appears in the above-identified patent and that said Letters Patent is hereby corrected as shown below:

Column 7, line 54, "value"
    should be --valve--

Column 7, line 54, "allignment"
    should be --alignment--

Column 7, line 57, "value"
    should be --valve--

Column 7, line 58, "value"
    should be --valve--

Column 7, line 59, "value"
    should be --valve--

Column 7, line 61, "value"
    should be --valve--

Column 7, line 62, "value"
    should be --valve--

Column 7, line 66, "sprign"
    should be --spring--

Column 7, line 67, "intermediat"
    should be --intermediate--

Column 7, line 67, "value"
    should be --valve--

Column 8, line 4, "value"
    should be --valve--

UNITED STATES PATENT AND TRADEMARK OFFICE
CERTIFICATE OF CORRECTION

PATENT NO. : 4,723,896

DATED : February 9, 1988

INVENTOR(S) : Jack F. Fritchman

It is certified that error appears in the above-identified patent and that said Letters Patent is hereby corrected as shown below:

Column 8, line 14, "spring 6B"
    should be --spring 68--

Column 8, line 14, "value"
    should be --valve--

Column 8, line 16, "sprign 6B"
    should be --spring 68--

Column 8, line 28, "sho9uld"
    should be --should--

Column 8, line 29, "moidifications"
    should be --modifications--

Column 8, line 34, "cylinder block said"
    should be --cylinder block, said--

Column 8, line 66, after "unequal"
    insert --length--

Column 9, line 11, "contracting"
    should be --contacting--

UNITED STATES PATENT AND TRADEMARK OFFICE
CERTIFICATE OF CORRECTION

PATENT NO. : 4,723,896

DATED : February 9, 1988

INVENTOR(S) : Jack F. Fritchman

It is certified that error appears in the above-identified patent and that said Letters Patent is hereby corrected as shown below:

Column 10, line 15, "sadi"
    should be --said--

Column 10, line 21, "extend"
    should be --extending--.

Signed and Sealed this

Twelfth Day of July, 1988

Attest:

*Attesting Officer*

DONALD J. QUIGG

*Commissioner of Patents and Trademarks*